United States Patent
Xu et al.

(10) Patent No.: US 11,627,484 B2
(45) Date of Patent: Apr. 11, 2023

(54) ULCI TRIGGERED CLI MEASUREMENT

(71) Applicant: QUALCOMM Incorporated, San Diego, CA (US)

(72) Inventors: Huilin Xu, Temecula, CA (US); Seyedkianoush Hosseini, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/363,892

(22) Filed: Jun. 30, 2021

(65) Prior Publication Data

US 2023/0007515 A1 Jan. 5, 2023

(51) Int. Cl.
*H04W 4/00* (2018.01)
*H04W 24/08* (2009.01)
*H04W 72/541* (2023.01)
*H04W 24/10* (2009.01)

(52) U.S. Cl.
CPC .......... *H04W 24/08* (2013.01); *H04W 24/10* (2013.01); *H04W 72/541* (2023.01)

(58) Field of Classification Search
CPC ... H04W 24/08; H04W 24/10; H04W 72/541; H04W 72/23
See application file for complete search history.

(56) References Cited

U.S. PATENT DOCUMENTS

| | | | |
|---|---|---|---|
| 2020/0169341 A1* | 5/2020 | Hwang | H04W 24/10 |
| 2020/0229009 A1 | 7/2020 | Xu et al. | |
| 2021/0021355 A1 | 1/2021 | Hwang et al. | |

FOREIGN PATENT DOCUMENTS

WO WO-2021158480 A1 * 8/2021

OTHER PUBLICATIONS

Venkatasubramanian, Sathya; "Cross-link interference in TDD networks and what to do about it"; Jun. 10, 2020. (Year: 2020).*
3GPP TSG RAN WG#102-e; "Summary of UL inter UE prioritization"; e-meeting Aug. 17, 2020. (Year: 2020).*
International Search Report and Written Opinion—PCT/US2022/072946—ISA/EPO—dated Sep. 27, 2022.

* cited by examiner

*Primary Examiner* — Thai D Hoang
(74) *Attorney, Agent, or Firm* — Patterson & Sheridan, L.L.P.

(57) ABSTRACT

Certain aspects of the present disclosure provide a method for wireless communication by a user equipment (UE). The UE receives an uplink (UL) cancellation indication (ULCI) from a network entity cancelling resources assigned to the UE for UL transmission and indicating the UE to measure cross-link interference (CLI) from one or more other UEs within the cancelled resources. The UE measures the CLI from the one or more other UEs based on the ULCI. The UE sends a CLI measurement report based on the measured CLI to the network entity.

30 Claims, 10 Drawing Sheets

ULCI TRIGGERED CLI MEASUREMENT

BACKGROUND

Field of the Disclosure

Aspects of the present disclosure relate to wireless communications, and more particularly, to techniques for measuring cross-link interference (CLI) based on an uplink (UL) cancellation indication (ULCI).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved and desirable techniques for measuring cross-link interference (CLI) based on an uplink (UL) cancellation indication (ULCI).

Certain aspects of the subject matter described in this disclosure can be implemented in a method for wireless communications by a user equipment (UE). The method generally includes receiving, from a network entity, a ULCI cancelling resources assigned to the UE for UL transmission and indicating the UE is to measure CLI from one or more other UEs within the cancelled resources; measuring the CLI from the one or more other UEs based on the ULCI; and sending, to the network entity, a CLI measurement report based on the measured CLI.

Certain aspects of the subject matter described in this disclosure can be implemented in a method for wireless communications by a network entity. The method generally includes transmitting, to a UE, a ULCI cancelling resources assigned to the UE for UL transmission and indicating whether the UE is to measure CLI from one or more other UEs within the cancelled resources; and receiving, from the UE, an indication of the CLI measured by the UE based on the ULCI.

Certain aspects of the subject matter described in this disclosure can be implemented in an apparatus for wireless communications by a UE. The apparatus generally includes at least one application processor and a memory configured to: receive, from a network entity, a ULCI cancelling resources assigned to the UE for UL transmission and indicating the UE is to measure CLI from one or more other UEs within the cancelled resources; measure the CLI from the one or more other UEs based on the ULCI; and send, to the network entity, a CLI measurement report based on the measured CLI.

Certain aspects of the subject matter described in this disclosure can be implemented in an apparatus for wireless communications by a network entity. The apparatus generally includes at least one application processor and a memory configured to: transmit, to a UE, a ULCI cancelling resources assigned to the UE for UL transmission and indicating whether the UE is to measure CLI from one or more other UEs within the cancelled resources; and receive, from the UE, an indication of the CLI measured by the UE based on the ULCI.

Certain aspects of the subject matter described in this disclosure can be implemented in an apparatus for wireless communications by a UE. The apparatus generally includes means for receiving, from a network entity, a ULCI cancelling resources assigned to the UE for UL transmission and indicating the UE is to measure CLI from one or more other UEs within the cancelled resources; means for measuring the CLI from the one or more other UEs based on the ULCI; and means for sending, to the network entity, a CLI measurement report based on the measured CLI.

Certain aspects of the subject matter described in this disclosure can be implemented in an apparatus for wireless communications by a network entity. The apparatus generally includes means for transmitting, to a UE, a ULCI cancelling resources assigned to the UE for UL transmission and indicating whether the UE is to measure CLI from one or more other UEs within the cancelled resources; and means for receiving, from the UE, an indication of the CLI measured by the UE based on the ULCI.

Certain aspects of the subject matter described in this disclosure can be implemented in a computer readable medium storing computer executable code thereon for wireless communications by a UE. The computer readable medium generally includes code for receiving, from a network entity, a ULCI cancelling resources assigned to the UE for UL transmission and indicating the UE is to measure CLI from one or more other UEs within the cancelled resources; code for measuring the CLI from the one or more other UEs based on the ULCI; and code for sending, to the network entity, a CLI measurement report based on the measured CLI.

Certain aspects of the subject matter described in this disclosure can be implemented in a computer readable medium storing computer executable code thereon for wireless communications by a network entity. The computer readable medium generally includes code for transmitting, to a UE, a ULCI cancelling resources assigned to the UE for UL transmission and indicating whether the UE is to measure CLI from one or more other UEs within the cancelled resources; and code for receiving, from the UE, an indication of the CLI measured by the UE based on the ULCI.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
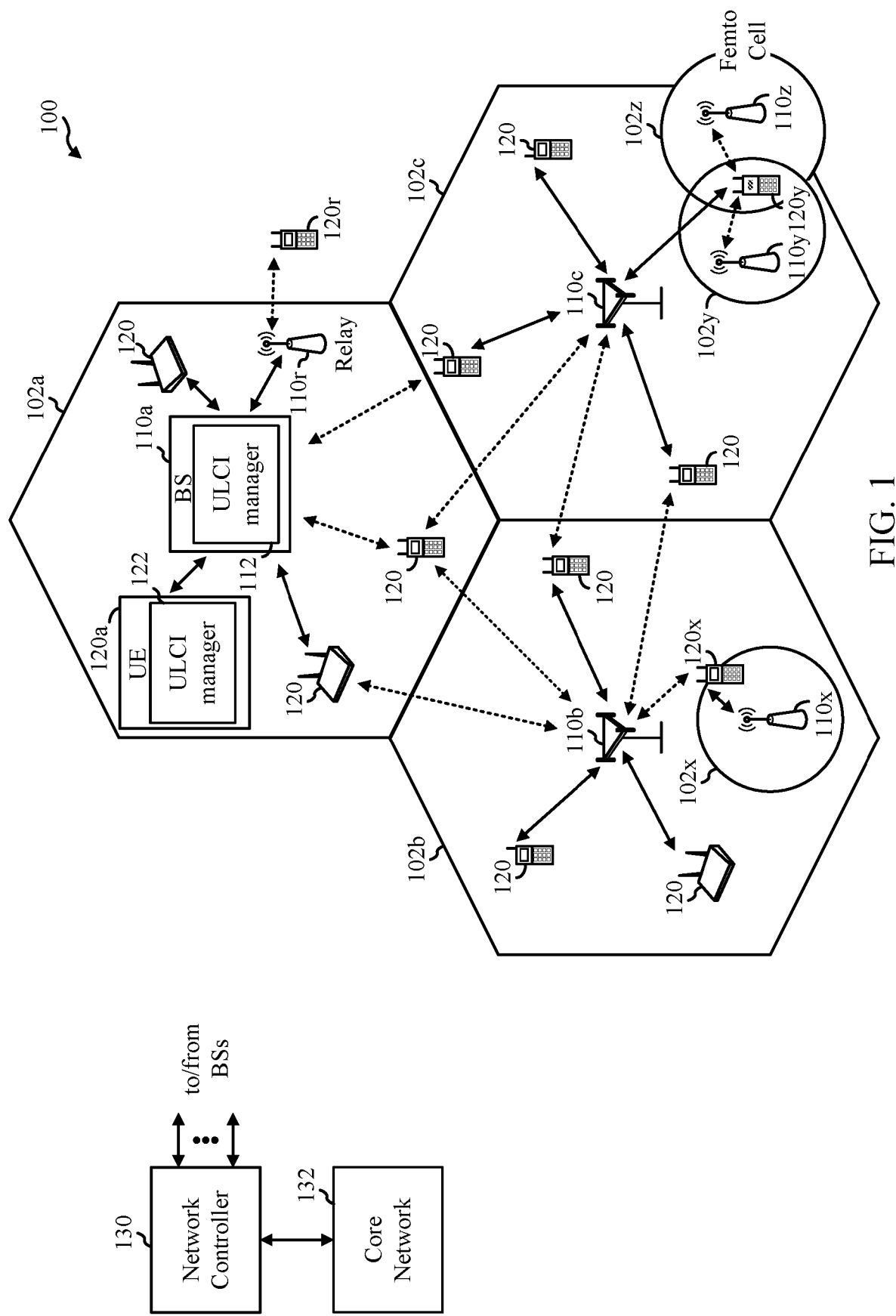
FIG. 1 is a block diagram conceptually illustrating an example wireless communication network, in accordance with certain aspects of the present disclosure.

Aspects of the present disclosure provide apparatuses, methods, processing systems, and computer readable mediums for measuring cross-link interference (CLI) by a user equipment (UE) based on an uplink (UL) cancellation indication (ULCI) from a network entity. The ULCI signaling may indicate that the UE is to measure the CLI from one or more other UEs within cancelled resources based on the ULCI. The UE measures the CLI from the other UEs within the cancelled resources, generates and sends a CLI measurement report indicating the measured CLI to the network entity.

The following description provides examples of ULCI triggered CLI measurement in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3$^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz- 7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 configured for managing cross-link interference (CLI) measurement based on an uplink (UL) cancellation indication (ULCI). As shown in FIG. 1, a UE 120a includes a ULCI manager 122 configured to perform operations 600 of FIG. 6, and a BS 110a includes a ULCI manager 112 configured to perform operations 700 of FIG. 7.

The wireless communication network 100 may be a new radio (NR) system (e.g., a 5$^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS 110 may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
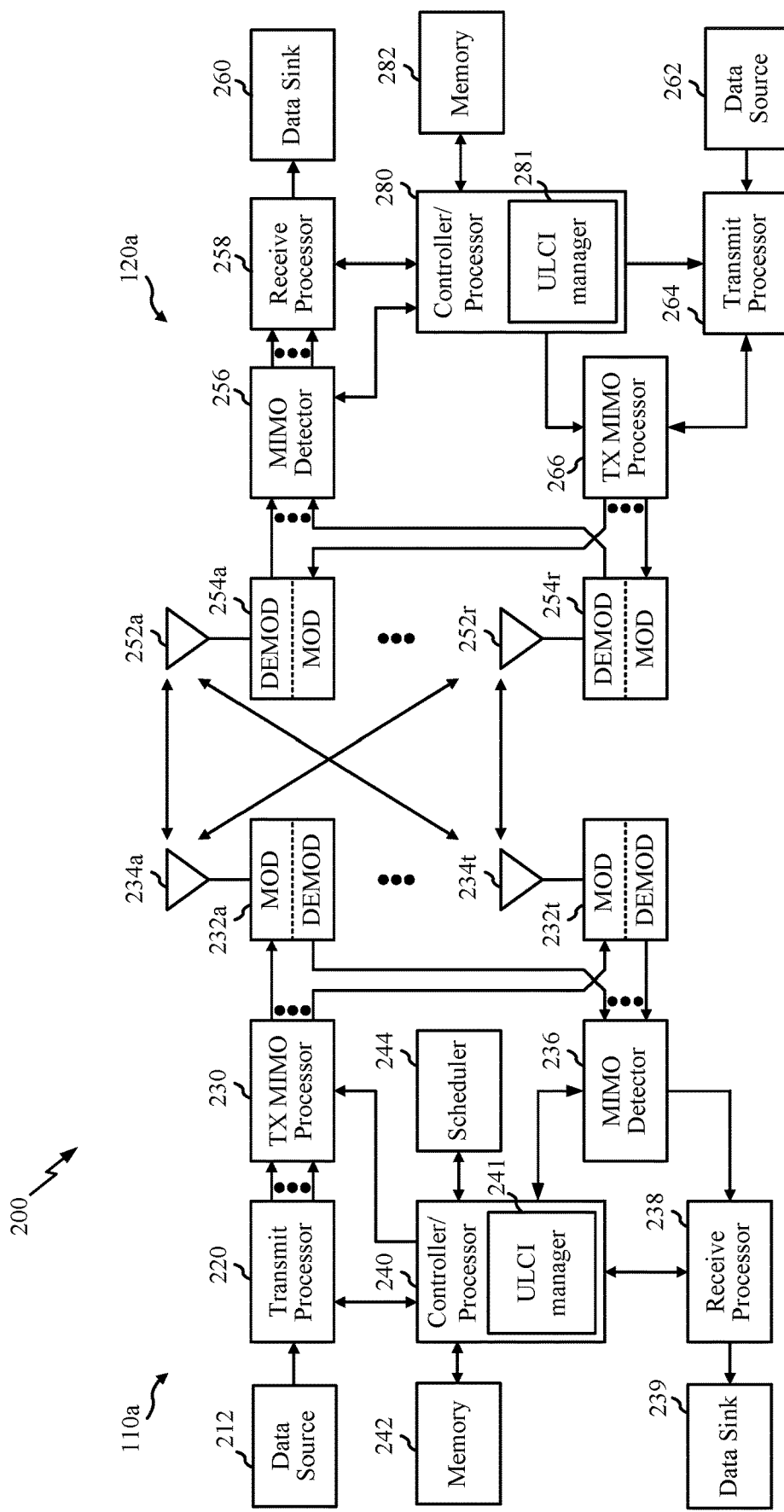
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a ULCI manager 241 that may be configured to perform the operations illustrated in FIG. 7, as well as other operations disclosed herein. As shown in FIG. 2, the controller/processor 280 of the UE 120a has a ULCI manager 281 that may be configured to perform the operations illustrated in FIG. 6, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
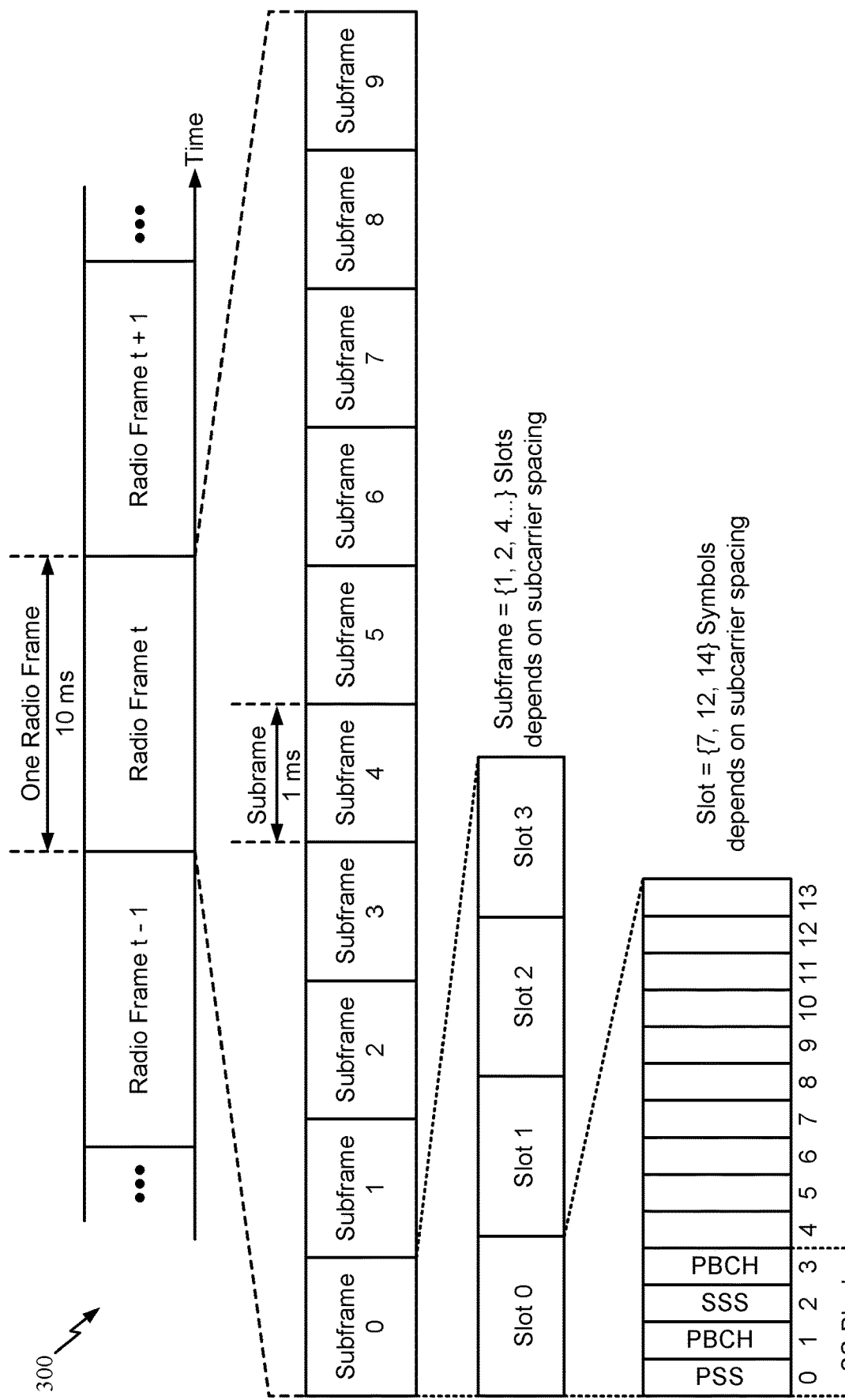
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example Uplink (UL) Cancellation Indication (ULCI)

A wireless communications system supports different traffic, which may include communications traffic having different reliability thresholds, different latency thresholds, different services, or various combinations thereof. For example, the wireless communications system may support a first traffic type associated with relatively high reliability targets and relatively low latency targets, such as ultra-reliable low-latency communications (URLLC) traffic type. The wireless communication system may also support a second traffic type associated with relatively low reliability targets and relatively long latency thresholds, such as enhanced mobile broadband (eMBB) traffic type. In some cases, to support various system operations such as efficient utilization of wireless communication resources, appropriate allocation or balancing of wireless communication resources, appropriate support of traffic according to different prioritization or latency threshold, the wireless communications system may support resource sharing between traffic types, such as a dynamic allocation of resources between URLLC communications and eMBB communications, or other communications, according to different traffic types, categories, or other prioritizations.

The wireless communications system includes a base station (BS), which schedules resources for a user equipment (UE) to use in transmission or reception, e.g., of eMBB data. The BS may become aware of a more urgent, higher priority transmission from another UE. For example, the other transmission may be from a latency sensitive UE requiring the URLLC. In such circumstances, the BS may reclaim the resources previously scheduled to a lower priority first UE for use by a higher priority second UE. If the previously scheduled resources are for an uplink (UL) transmission, the BS sends a UL cancellation indication (ULCI) in a ULCI occasion to the first UE to cancel at least a portion of the lower priority (e.g., eMBB) UL transmission from the first UE. The BS may then allocate the reclaimed resources to the higher priority, latency sensitive second UE for a higher priority (e.g., URLLC) transmission.

Figure 4:
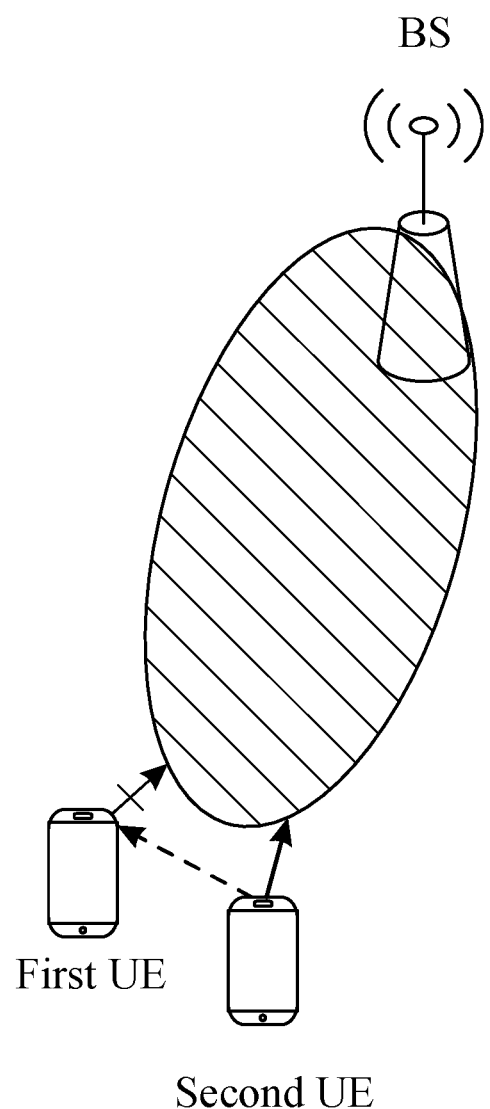
FIG. 4 illustrates an example wireless communication system that supports an uplink (UL) transmission cancellation.

As illustrated in FIG. 4, a BS is configured to send a ULCI when two UEs (such as a first UE and a second UE) are within a coverage of a same beam from the BS. For example, initially, the BS (or other network entity) allocates UL resources (e.g., an initial UL resource allocation) to the first UE for UL transmissions. The BS subsequently determines to perform a reallocation of the previously-allocated UL resources, which may be triggered by a need or a request to support higher-priority communications from a nearby second UE. The BS then generates and transmits the ULCI to the first UE that may correspond to at least a portion of the previously-allocated UL resources (e.g., as allocated to the first UE). The first UE is configured to monitor for the ULCI, and accordingly determines, based at least in part on received ULCI, whether or not to proceed with the UL transmissions using their previously-allocated UL resources. Based on the ULCI, the resources that were originally allocated to the first UE for eMBB communications are reallocated to the second UE for URLLC communications.

Figure 5:
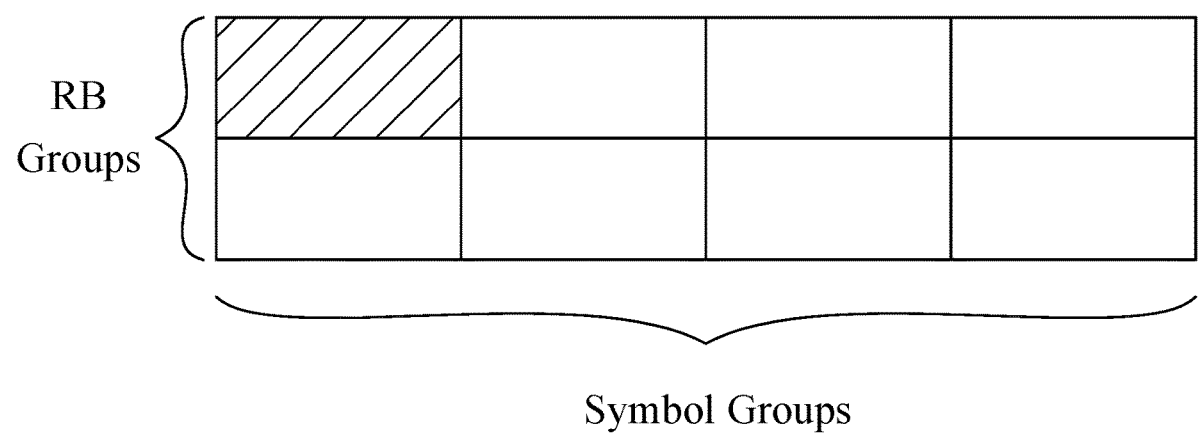
FIG. 5 illustrates example symbol groups and resource block (RB) groups.

In some cases, the BS sends the ULCI to the first UE via a downlink control information (DCI) such as a DCI format 2_4. The ULCI DCI contains multiple cancellation indication fields and each cancellation indication field corresponds to one UL carrier. In some cases, the ULCI is indicated to the first UE based on indicated symbol groups and resource block (RB) groups. In one example, as illustrated in FIG. 5, one RB group in one symbol group may be a smallest resource cancellation unit.

As noted above, when the BS sends the ULCI to the first UE to cancel the resources assigned to the first UE and reassign these resources to the second UE, it may imply that the first UE and the second UE are geographically close to each other. If the first UE and the second UE were not geographically close to each other, spatial domain multiplexed (SDM) resources can be allocated to the first UE and the second UE for concurrent transmissions. When the first UE and the second UE are geographically close to each other, an UL transmission from one of these UEs may be detected by another UE (e.g., similar to a cross-link interference (CLI) measurement of Rel-16).

Example Cross-Link Interference (CLI)

In Rel-16, a cross-link interference (CLI) is defined to measure interference between two user equipments (UEs) that are geographically close to each other. For example, when a first UE (i.e., an aggressor UE) is transmitting, a second UE (i.e., a victim UE) located close to the first UE may receive a transmission from the first UE as the CLI if the second UE is receiving transmissions.

In Rel-16, signaling and procedure is specified for the victim UE to measure the CLI from the aggressor UE. Generally, the aggressor UE does not transmit any transmissions dedicatedly for CLI measurement by another victim UE. Also, the aggressor UE does not know that a UL transmission from the aggressor UE is being measured for the CLI by the victim UE. The victim UE measures the CLI when a base station (BS) configures CLI measurement resources to the victim UE. Based on the CLI measurement resources, the victim UE performs a periodic measurement to measure the CLI based on a sounding reference signal (SRS) reference signal receive power (RSRP) or a received signal strength indicator (RSSI). The victim UE measures the CLI from the aggressor UE based on the SRS RSRP or the RSSI, and then generates a CLI measurement report indicating the measured CLI. The victim UE sends the CLI measurement report to the BS. In some cases, based on the CLI measurement report received from the victim UE, the BS manages scheduling of the aggressor UE and the victim UE to balance a throughput of different UEs.

In Rel-16, layer 3 (such as a radio resource control (RRC) layer) CLI measurement is defined. However, layer 1 (such as a physical (PHY) layer) CLI measurement supports more prompt CLI measurement for a dynamic time division duplex (TDD). The layer 1 CLI measurement may be triggered by a downlink control information (DCI) (e.g., in a similar way to a channel state information (CSI) measurement and report).

As noted above, for an uplink (UL) cancellation indication (ULCI) scenario in a wireless communications system, two UEs (a first UE and a second UE) may be sufficiently close to each other. When a BS sends the ULCI to the first UE to cancel resources assigned to the first UE and reassign the cancelled resources to the second UE, the ULCI can also provide a free signaling enabling the first UE to measure potential interference from other nearby UEs (such as the second UE) UL transmission. The first UE may then generate and send a CLI measurement report indicating the measured CLI from the second UE to the BS. The BS can use the CLI measurement report to manage the first UE and the second UE, e.g., when a dynamic TDD is enabled. Accordingly, it is useful that the first UE that cancels the resources based on the ULCI measures the UL transmission from the second UE (for which the cancelled resources are reassigned to).

Example ULCI Triggered CLI Measurement

Aspects of the present disclosure provide apparatuses, methods, processing systems, and computer readable mediums for measuring cross-link interference (CLI) based on an uplink (UL) cancellation indication (ULCI). For example, a first user equipment (UE) may receive a ULCI from a base station (BS) triggering the first UE to measure a potential CLI from other nearby UEs (such as a second UE) UL transmission. The BS receives the measured CLI from the first UE, which is used by the BS to manage a potential future interference between the first UE and the second UE to enhance an overall throughput.

Figure 6:
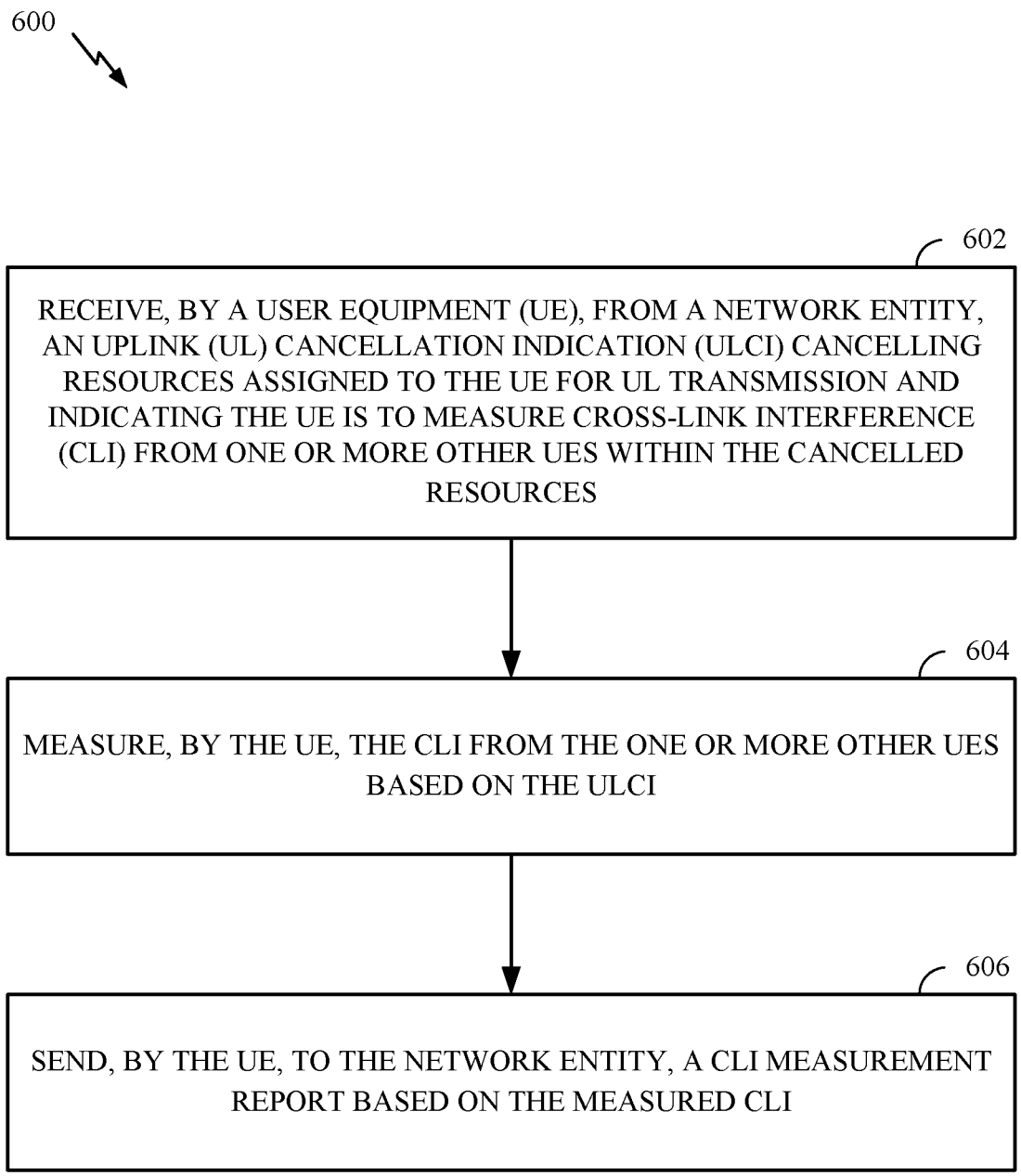
FIG. 6 is a flow diagram illustrating example operations for wireless communications by a UE, in accordance with certain aspects of the present disclosure.

FIG. 6 is a flow diagram illustrating example operations 600 for wireless communication by a UE, in accordance with certain aspects of the present disclosure. The operations 600 may be performed, for example, by the UE 120a in the wireless communication network 100. The operations 600 may be implemented as software components that are executed and run on one or more processors (e.g., the controller/processor 280 of FIG. 2). Further, the transmission and reception of signals by the UE in operations 600 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 600 begin, at 602, by receiving, from a network entity, a ULCI cancelling resources assigned to the UE for UL transmission and indicating the UE is to measure CLI from one or more other UEs within the cancelled resources. For example, the UE may receive the ULCI from the network entity using antenna(s) and receiver/transceiver components of the UE 120a shown in FIG. 1 or FIG. 2 and/or of the apparatus shown in FIG. 9.

At 604, the UE measures the CLI from the one or more other UEs based on the ULCI. For example, the UE may measure the CLI from the one or more other UEs using a processor of the UE 120a shown in FIG. 1 or FIG. 2 and/or of the apparatus shown in FIG. 9.

At 606, the UE sends, to the network entity, a CLI measurement report based on the measured CLI. For example, the UE may send the CLI measurement report to the network entity using antenna(s) and transmitter/transceiver components of the UE 120a shown in FIG. 1 or FIG. 2 and/or of the apparatus shown in FIG. 9.

Figure 7:
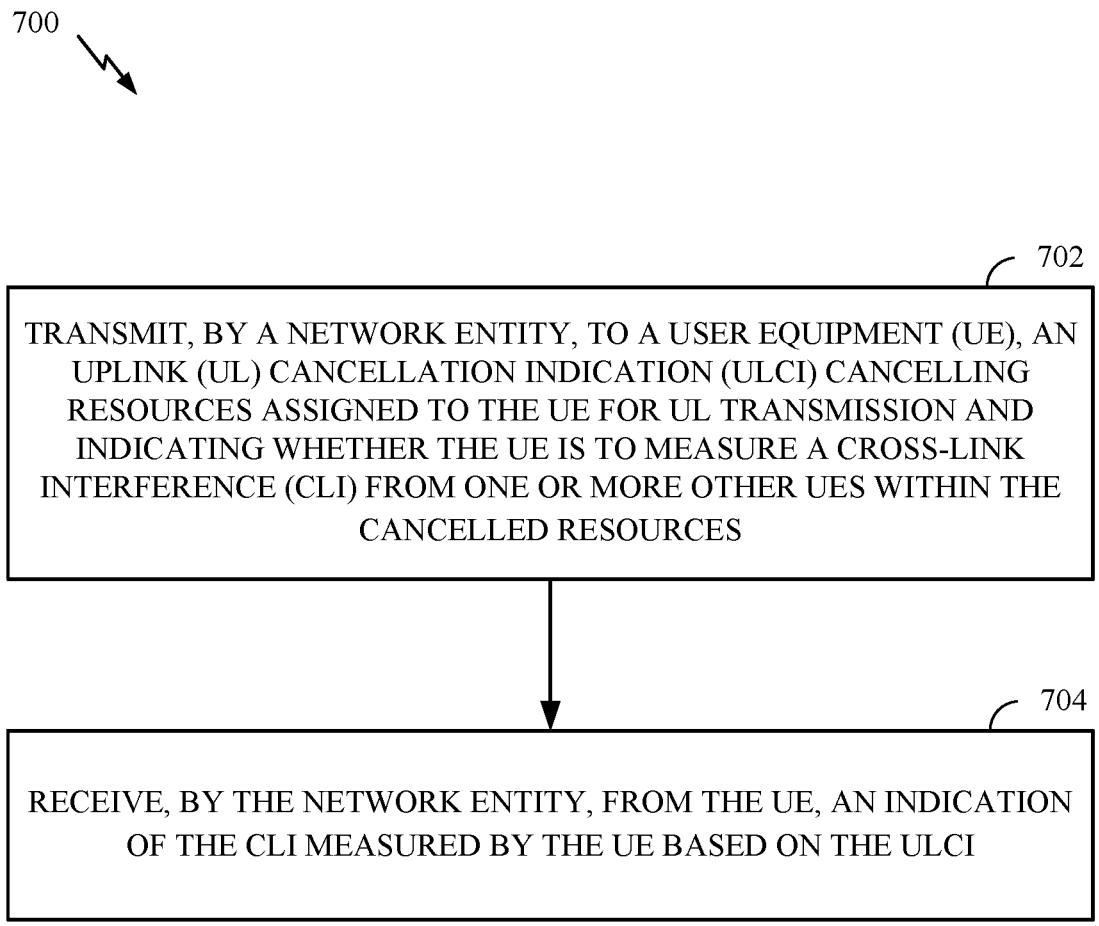
FIG. 7 is a flow diagram illustrating example operations for wireless communications by a network entity, in accordance with certain aspects of the present disclosure.

FIG. 7 is a flow diagram illustrating example operations 700 that may be considered complementary to operations 600 of FIG. 6. For example, operations 700 may be performed by the network entity (e.g., such as the BS 110a in the wireless communication network 100) to trigger a UE (performing operations 600 of FIG. 6) to generate and send a CLI measurement report. The operations 700 may be implemented as software components that are executed and run on one or more processors (e.g., the controller/processor 240 of FIG. 2). Further, the transmission and reception of signals by the BS in operations 700 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240) obtaining and/or outputting signals.

The operations 700 begin, at 702, by transmitting, to a UE, a ULCI cancelling resources assigned to the UE for UL transmission and indicating whether the UE is to measure CLI from one or more other UEs within the cancelled resources. For example, the network entity may transmit the ULCI to the UE using antenna(s) and transmitter/transceiver components of the BS 110a shown in FIG. 1 or FIG. 2 and/or of the apparatus shown in FIG. 10.

At 704, the network entity receives from the UE an indication of the CLI measured by the UE based on the ULCI. For example, the network entity may receive the indication of the CLI measured from the UE using antenna(s) and receiver/transceiver components of the BS 110a shown in FIG. 1 or FIG. 2 and/or of the apparatus shown in FIG. 10.

Figure 8:
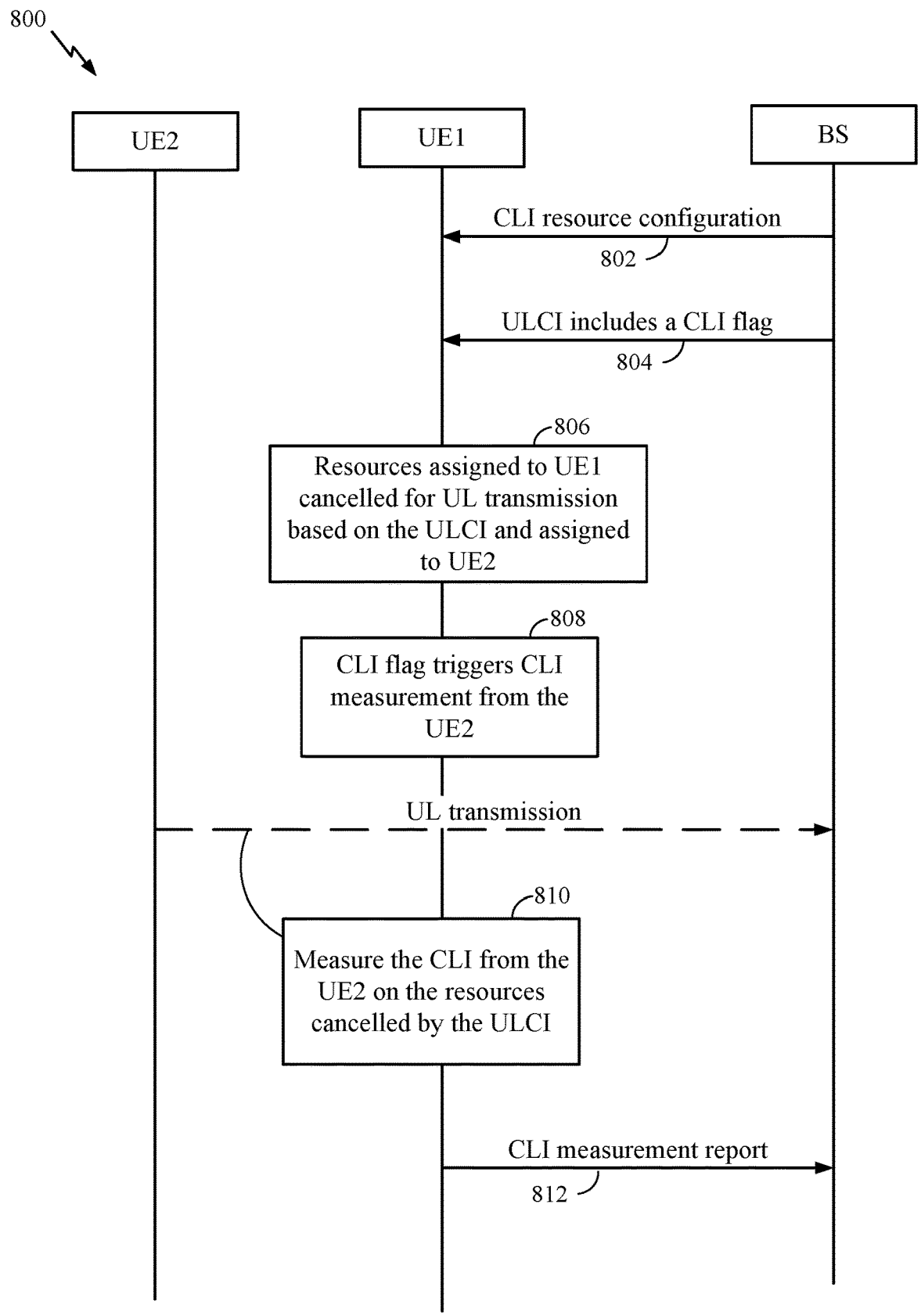
FIG. 8 is a call flow diagram illustrating example signaling for cross-link interference (CLI) measurement based on a UL cancellation indication (ULCI), in accordance with certain aspects of the present disclosure.

The operations shown in FIGS. 6 and 7 may be understood with reference to the call flow diagram of FIG. 8. In other words, the BS of FIG. 8 may perform operations 700 of FIG. 7 to trigger UE1 to generate and send a CLI measurement according to operations 600 of FIG. 6.

As illustrated in FIG. 8, at 802, the BS (e.g., the BS 110a shown in FIG. 1 or FIG. 2) sends signaling indicating a CLI resource configuration to UE1 (e.g., the UE 120a shown in FIG. 1 or FIG. 2). For example, the BS may send the CLI resource configuration to the UE1 via a radio resource control (RRC) signaling. In certain aspects, the CLI resource configuration indicates a CLI threshold to the UE1. The UE1 may use the CLI threshold for event-triggered CLI measurement report.

At 804, the BS sends signaling to the UE1 indicating a ULCI. For example, the BS sends the ULCI to the UE1 via a downlink control information (DCI). In some examples, the DCI may have a DCI format 2_4 or any other format.

In certain aspects, the ULCI indicates cancelling of resources assigned to the UE1 for UL transmission. In some examples, the ULCI explicitly indicates some symbols (e.g., a first set of symbols) for cancellation.

In certain aspects, the ULCI includes a CLI flag. For example, the CLI flag in the ULCI indicates to the UE1 whether a CLI measurement from other UEs is triggered by the ULCI.

At 806, the resources assigned to the UE1 are cancelled for the UL transmission based on the ULCI. The cancelled resources are then assigned to one or multiple other UEs (e.g., a UE2) based on the ULCI. The UE1 and the UE2 are located close to each other.

In certain aspects, the UE1 cancels the first set of symbols as indicated by the ULCI. In certain aspects, the UE1 cancels other symbols (e.g., a second set of symbols) when the UL transmission of the UE1 partially overlaps with the cancelled resources based on the ULCI.

At 808, the UE1 is triggered by the CLI flag in the ULCI to measure the CLI from the one or more other UEs within the cancelled resources (i.e., the UE2).

In certain aspects, the CLI flag includes a bit indicating the UE1 to measure the CLI for all cancellation indications in the ULCI. In certain aspects, the CLI flag includes a bit for each cancellation indication in the ULCI. For example, each bit may indicate to the UE1 whether the UE1 has to measure the CLI for a corresponding cancellation indication. In certain aspects, when one bit is used to indicate whether the CLI is measured for the resources cancelled by each cancellation indication, the BS separately indicates to the UE1 whether to measure the CLI for each UL carrier. In certain aspects, when the BS does not separately indicate to the UE1 whether to measure the CLI for each UL carrier, the UE1 measures the CLI on each of its active UL carriers if the resources are cancelled on the UL carrier.

In certain aspects, the ULCI indicates a resource granularity for measuring the CLI from the one or more other UEs within the cancelled resources (such as the UE2). For example, the resource granularity may be indicated to the UE1 via the ULCI to allow the UE1 to separately report the CLI for the one or more other UEs. In certain aspects, the resource granularity may indicate the UE1 to measure a single CLI from the one or more other UEs across all the cancelled resources on each UL carrier. In certain aspects, the resource granularity may indicate the UE1 to separately measure the CLI for each pair of symbol group and resource block (RB) group within the cancelled resources. In certain aspects, the resource granularity may indicate the UE1 to separately measure the CLI for each pair of symbol and RB group within the cancelled resources.

At 810, the UE1 measures the CLI from the UE2, on the resources cancelled by the ULCI, during the UL transmission from the UE2.

In certain aspects, the UE1 does not perform the CLI measurement over the symbols that are cancelled but not explicitly indicated by the ULCI. In some examples, the UE1 may measure the CLI from the UE2 over the first set of symbols (that are explicitly indicated by the ULCI for cancellation from the UE1 and assigned to the UE2). In some examples, the UE1 may not measure the CLI from the UE2 over the second set of symbols (that were not explicitly indicated by the ULCI since the CLI measurement is not performed over the symbols that are cancelled but not explicitly indicated by the ULCI).

In certain aspects, the CLI measurement is a receiving operation and a cancelled UL is a transmission operation. In certain aspects, the CLI measurement based on the ULCI may be restricted in flexible symbols of the UE1. However, in some cases, the CLI measurement based on the ULCI may be possible in a semi-static or dynamic UL symbol if a timeline allows the UE1 to switch from the transmission operation to the receiving operation in the symbols indicated by the ULCI. In certain aspects, the UE1 may be provided with a minimum gap, to switch from its UL transmission to receiving the UE2 UL transmission, after receiving the ULCI.

In some cases (such as Rel-16), a first symbol where the UE1 may cancel its UL transmission on receiving the ULCI starts after $T_{proc,2}+d$ symbols from an end of a reception of a physical downlink control channel (PDCCH) that carries the DCI format 2_4. In $T_{proc,2}+d$ symbols, $d \in \{0,1,2\}$ is reported as a UE1 capability. $T_{proc,2}$ is a UE1 processing time for a physical uplink shared channel (PUSCH) when $d_{2,1}=0$ and $N_2$ of a minimum processing capability 2 is assumed. In certain aspects, the minimum gap for the UE1 to measure the CLI from the UE2, after receiving the ULCI indicating to measure the CLI, may be increased by adding a positive offset.

In certain aspects, the UE1 measures the CLI from the UE2 from a starting location in a time after a minimum gap from a reception of the ULCI. For example, a first symbol where the UE1 may measure the CLI from the UE2 starts after $T_{proc,2}+d+d_{cli}$ symbols from an end of a reception of signaling that carries the ULCI (e.g., DCI format 2_4). In $T_{proc,2}+d+d_{cli}$, $T_{proc,2}+d$ is the minimum gap required by a regular ULCI and $d_{cli}$ is an additional gap for the UE1 for the CLI measurement.

In certain aspects, the UE1 measures the CLI from the UE2 based on the ULCI by measuring a received signal strength indication (RSSI) from the UE2. For example, the ULCI received by the UE1 may trigger the RSSI measurement from the UE2. The RSSI measurement may be considered as a layer 1 aperiodic CLI measurement report (e.g., in a similar way to an aperiodic channel state information (CSI) framework). In some cases (such as for 3rd generation partnership project (3GPP) new radio (NR) Rel-16), the CLI may be based on a layer 3 measurement. In some cases, the CLI measurement and report may be extended to the layer 1 measurement based on a CSI measurement and report framework. For example, in a DCI format 0_1 for aperiodic CSI triggering, one or more fields such as a CSI request field (to select one of up to 64 trigger states) and a carrier indicator field (to determine a carrier where the CSI report is transmitted) are included.

In certain aspects, the ULCI is a special triggering signaling for layer 1 CLI measurement. In some cases, for the CLI measurement from the UE2, an associated trigger state and a carrier indicator may be configured by a RRC for the ULCI triggered CLI measurement. In such cases, no additional bits have to be added in the ULCI sent to the UE1 to indicate triggering of the CLI measurement from the UE2.

In certain aspects, a trigger state may be associated with the ULCI to measure the CLI from the UE2 based on the ULCI. The UE1 then generates a CLI measurement report based on the measured CLI.

At 812, the UE1 sends the CLI measurement report based on the measured CLI to the BS. In certain aspects, when there is more than one other UE sending UL transmissions within the cancelled resources, the UE1 may separately report the CLI measurement report for each other UE to the BS.

In certain aspects, a size of the CLI measurement report depends on the resource granularity. For example, when the resource granularity is finer, the size of the CLI measurement report is large. In certain aspects, to reduce the size of the CLI measurement report, the CLI measurement report may only indicate whether the measured CLI from the UE2 is above the CLI threshold (indicated in the CLI resource configuration).

In certain aspects, the UE sends the CLI measurement report to the BS on a UL carrier. In one non-limiting example, the UL carrier for sending the CLI measurement report may be associated with a downlink (DL) carrier where the UE receives the ULCI from the BS. In another non-limiting example, the UE carrier may be associated with a cancellation indication field indicating the cancelled resources in the ULCI. In another non-limiting example, the UL carrier may be indicated in the associated trigger state, and the UL carrier may include a configured UL carrier used to transmit the CLI measurement report in the trigger state.

Example Wireless Communication Devices

Figure 9:
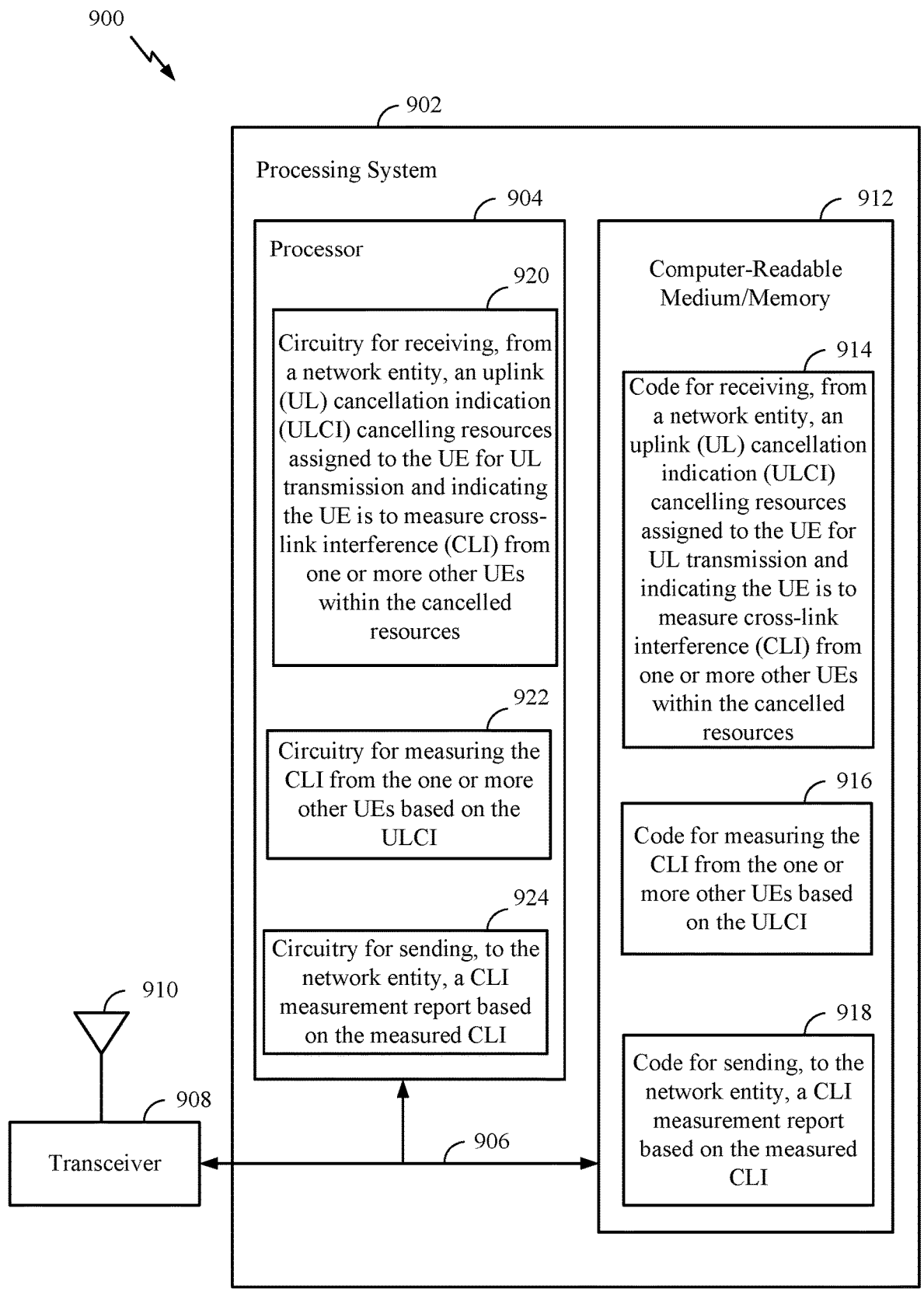
FIG. 9 illustrates a communications device that may include various components configured to perform operations for the techniques disclosed herein, in accordance with certain aspects of the present disclosure.

FIG. 9 illustrates a communications device 900 that may include various components (e.g., corresponding to means-plus-function components) configured to perform operations for the techniques disclosed herein, such as the operations illustrated in FIG. 6. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 is configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., a computer-executable code) that when executed by the processor 904, cause the processor 904 to perform the operations illustrated in FIG. 6, or other operations for performing the various techniques discussed herein. In certain aspects, computer-readable medium/memory 912 stores code 914 for receiving, code 916 for measuring, and code 918 for sending. The code 914 for receiving may include code for receiving, from a network entity, a ULCI cancelling resources assigned to the UE for UL transmission and indicating the UE is to measure CLI from one or more other UEs within the cancelled resources. The code 916 for measuring may include code for measuring the CLI from the one or more other UEs based on the ULCI. The code 918 for sending may include code for sending, to the network entity, a CLI measurement report based on the measured CLI.

The processor 904 may include circuitry configured to implement the code stored in the computer-readable medium/memory 912, such as for performing the operations illustrated in FIG. 6, as well as other operations for performing the various techniques discussed herein. For example, the processor 904 includes circuitry 920 for receiving, circuitry 922 for measuring, and circuitry 924 for sending. The circuitry 920 for receiving may include circuitry for receiving, from a network entity, a ULCI cancelling resources assigned to the UE for UL transmission and indicating the UE is to measure CLI from one or more other UEs within the cancelled resources. The circuitry 922 for measuring may include circuitry for measuring the CLI from the one or more other UEs based on the ULCI. The circuitry 924 for sending may include circuitry for sending, to the network entity, a CLI measurement report based on the measured CLI.

Figure 10:
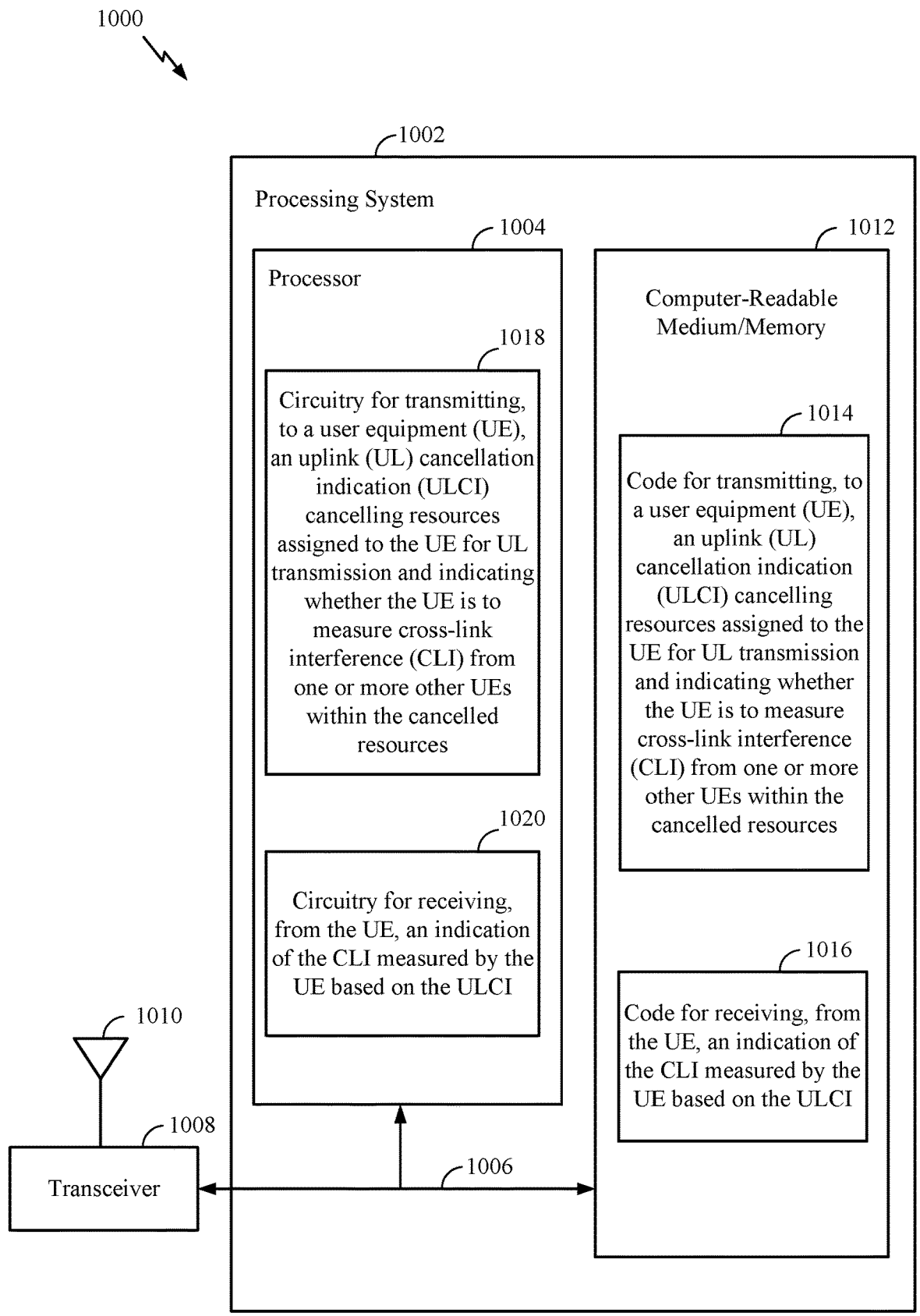
FIG. 10 illustrates a communications device that may include various components configured to perform operations for the techniques disclosed herein, in accordance with certain aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 is configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., a computer-executable code) that when executed by the processor 1004, cause the processor 1004 to perform the operations illustrated in FIG. 7, or other operations for performing the various techniques discussed herein. In certain aspects, computer-readable medium/memory 1012 stores code 1014 for transmitting and code 1016 for receiving. The code 1014 for transmitting may include code for transmitting, to a UE, a ULCI cancelling resources assigned to the UE for UL transmission and indicating whether the UE is to measure CLI from one or more other UEs within the cancelled resources. The code 1016 for receiving may include code for receiving, from the UE, an indication of the CLI measured by the UE based on the ULCI.

The processor 1004 may include circuitry configured to implement the code stored in the computer-readable medium/memory 1012, such as for performing the operations illustrated in FIG. 7, as well as other operations for performing the various techniques discussed herein. For example, the processor 1004 includes circuitry 1018 for transmitting and circuitry 1020 for receiving. The circuitry 1018 for sending may include circuitry for transmitting, to a UE, a ULCI cancelling resources assigned to the UE for UL transmission and indicating whether the UE is to measure CLI from one or more other UEs within the cancelled resources. The circuitry 1020 for receiving may include circuitry for receiving, from the UE, an indication of the CLI measured by the UE based on the ULCI.

Example Aspects

Implementation examples are described in the following numbered aspects.

In a first aspect, a method for wireless communications by a user equipment (UE), comprising: receiving, from a network entity, an uplink (UL) cancellation indication (ULCI) cancelling resources assigned to the UE for UL transmission and indicating the UE is to measure cross-link interference (CLI) from one or more other UEs within the cancelled resources; measuring the CLI from the one or more other UEs based on the ULCI; and sending, to the network entity, a CLI measurement report based on the measured CLI.

In a second aspect, alone or in combination with the first aspect, the ULCI comprises a flag indicating measurement of the CLI from the one or more other UEs within the cancelled resources is triggered by the ULCI.

In a third aspect, alone or in combination with one or more of the first and second aspects, the flag comprises a bit indicating the UE is to measure CLI for all cancellation indications in the ULCI.

In a fourth aspect, alone or in combination with one or more of the first through third aspects, the flag comprises a bit for each cancellation indication in the ULCI, each bit indicating whether the UE is to measure CLI for a corresponding cancellation indication.

In a fifth aspect, alone or in combination with one or more of the first through fourth aspects, the cancelled resources are assigned to the one or more other UEs; the UE separately reports the CLI measured for the one or more other UEs to the network entity; and the ULCI indicates a resource granularity for measuring the CLI from the one or more other UEs within the cancelled resources.

In a sixth aspect, alone or in combination with one or more of the first through fifth aspects, a size of the CLI measurement report depends on the resource granularity.

In a seventh aspect, alone or in combination with one or more of the first through sixth aspects, the resource granularity indicates: the UE is to measure a single CLI from the one or more other UEs across all the cancelled resources on each UL carrier; the UE is to separately measure the CLI for each pair of symbol group and resource block (RB) group within the cancelled resources; or the UE is to separately measure CLI for each pair of symbol and RB group within the cancelled resources.

In an eighth aspect, alone or in combination with one or more of the first through seventh aspects, receiving signaling indicating a CLI threshold, wherein the CLI measurement report indicates whether the measured CLI is above the threshold.

In a ninth aspect, alone or in combination with one or more of the first through eighth aspects, the ULCI explicitly indicates a first set of symbols for cancellation; and the UE cancels a second set of symbols when the UL transmission of the UE partially overlaps with the cancelled resources based on the ULCI.

In a tenth aspect, alone or in combination with one or more of the first through ninth aspects, the UE measures the CLI over the first set of symbols and does not measure the CLI over the second set of symbols.

In an eleventh aspect, alone or in combination with one or more of the first through tenth aspects, the UE measures the CLI from the one or more other UEs from a starting location in time after a minimum gap from a reception of the ULCI.

In a twelfth aspect, alone or in combination with one or more of the first through eleventh aspects, the measuring the CLI from the one or more other UEs comprises measuring a received signal strength indication (RSSI) from the one or more UEs.

In a thirteenth aspect, alone or in combination with one or more of the first through twelfth aspects, a trigger state is associated with the ULCI to measure the CLI from the one or more other UEs within the cancelled resources and generate the CLI measurement report based on the measured CLI.

In a fourteenth aspect, alone or in combination with one or more of the first through thirteenth aspects, the UE transmits the CLI measurement report to the network entity on a UL carrier, and wherein the UL carrier is associated with at least one of: a downlink (DL) carrier receiving the ULCI or a cancellation indication field indicating the cancelled resources in the ULCI.

In a fifteenth aspect, alone or in combination with one or more of the first through fourteenth aspects, the UL carrier comprises a configured UL carrier used to transmit the CLI measurement report, and wherein the UL carrier is indicated in a trigger state.

In a sixteenth aspect, a method for wireless communications by a network entity, comprising: transmitting, to a user equipment (UE), an uplink (UL) cancellation indication (ULCI) cancelling resources assigned to the UE for UL transmission and indicating whether the UE is to measure cross-link interference (CLI) from one or more other UEs within the cancelled resources; and receiving, from the UE, an indication of the CLI measured by the UE based on the ULCI.

In a seventeenth aspect, alone or in combination with the sixteenth aspect, the ULCI comprises a flag indicating measurement of the CLI from the one or more other UEs within the cancelled resources is triggered by the ULCI.

In an eighteenth aspect, alone or in combination with one or more of the sixteenth and seventeenth aspects, the flag comprises a bit indicating the UE is to measure CLI for all cancellation indications in the ULCI.

In a nineteenth aspect, alone or in combination with one or more of the sixteenth through eighteenth aspects, the flag comprises a bit for each cancellation indication in the ULCI, each bit indicating whether the UE is to measure CLI for a corresponding cancellation indication.

In a twentieth aspect, alone or in combination with one or more of the sixteenth through nineteenth aspects, the cancelled resources are assigned to the one or more other UEs; the network entity receives separate reports of the CLI measured for the one or more other UEs from the UE; and the ULCI indicates a resource granularity for measuring the CLI from the one or more other UEs within the cancelled resources.

In a twenty-first aspect, alone or in combination with one or more of the sixteenth through twentieth aspects, a size of a CLI measurement report indicating the CLI measured by the UE depends on the resource granularity.

In a twenty-second aspect, alone or in combination with one or more of the sixteenth through twenty-first aspects, sending signaling indicating a CLI threshold, wherein a CLI measurement report indicates whether the measured CLI is above the threshold.

In a twenty-third aspect, alone or in combination with one or more of the sixteenth through twenty-second aspects, a trigger state is associated with the ULCI to measure the CLI from the one or more other UEs within the cancelled resources and generate the CLI measurement report based on the measured CLI.

In a twenty-fourth aspect, alone or in combination with one or more of the sixteenth through twenty-third aspects, the network entity receives the CLI measurement report transmitted by the UE on a UL carrier, and wherein the UL carrier is associated with at least one of: a downlink (DL) carrier receiving the ULCI or a cancellation indication field indicating the cancelled resources in the ULCI.

In a twenty-fifth aspect, alone or in combination with one or more of the sixteenth through twenty-fourth aspects, the UL carrier comprises a configured UL carrier used to transmit the CLI measurement report, and wherein the UL carrier is indicated in a trigger state.

An apparatus for wireless communication, comprising at least one processor; and a memory coupled to the at least one processor, the memory comprising code executable by the at least one processor to cause the apparatus to perform the method of any of the first through twenty-fifth aspects.

An apparatus comprising means for performing the method of any of the first through twenty-fifth aspects.

A computer readable medium storing computer executable code thereon for wireless communications that, when executed by at least one processor, cause an apparatus to perform the method of any of the first through twenty-fifth aspects.

ADDITIONAL CONSIDERATIONS

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6 and 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
receiving, from a network entity, an uplink (UL) cancellation indication (ULCI) cancelling resources assigned to the UE for UL transmission and indicating the UE is to measure cross-link interference (CLI) from one or more other UEs within the cancelled resources;
measuring the CLI from the one or more other UEs based on the ULCI; and
sending, to the network entity, a CLI measurement report based on the measured CLI.

2. The method of claim 1, wherein the ULCI comprises a flag indicating measurement of the CLI from the one or more other UEs within the cancelled resources is triggered by the ULCI.

3. The method of claim 2, wherein the flag comprises a bit indicating the UE is to measure CLI for all cancellation indications in the ULCI.

4. The method of claim 2, wherein the flag comprises a bit for each cancellation indication in the ULCI, each bit indicating whether the UE is to measure CLI for a corresponding cancellation indication.

5. The method of claim 1, wherein:
the cancelled resources are assigned to the one or more other UEs;
the UE separately reports the CLI measured for the one or more other UEs to the network entity; and
the ULCI indicates a resource granularity for measuring the CLI from the one or more other UEs within the cancelled resources.

6. The method of claim 5, wherein a size of the CLI measurement report depends on the resource granularity.

7. The method of claim 6, wherein the resource granularity indicates:
the UE is to measure a single CLI from the one or more other UEs across all the cancelled resources on each UL carrier;
the UE is to separately measure the CLI for each pair of symbol group and resource block (RB) group within the cancelled resources; or
the UE is to separately measure CLI for each pair of symbol and RB group within the cancelled resources.

8. The method of claim 1, further comprising:
receiving signaling indicating a CLI threshold, wherein the CLI measurement report indicates whether the measured CLI is above the threshold.

9. The method of claim 1, wherein:
the ULCI explicitly indicates a first set of symbols for cancellation; and
the UE cancels a second set of symbols when the UL transmission of the UE partially overlaps with the cancelled resources based on the ULCI.

10. The method of claim 9, wherein the UE measures the CLI over the first set of symbols and does not measure the CLI over the second set of symbols.

11. The method of claim 1, wherein the UE measures the CLI from the one or more other UEs from a starting location in time after a minimum gap from a reception of the ULCI.

12. The method of claim 1, wherein the measuring the CLI from the one or more other UEs comprises measuring a received signal strength indication (RSSI) from the one or more UEs.

13. The method of claim 1, wherein a trigger state is associated with the ULCI to measure the CLI from the one or more other UEs within the cancelled resources and generate the CLI measurement report based on the measured CLI.

14. The method of claim 1, wherein the UE transmits the CLI measurement report to the network entity on a UL carrier, and wherein the UL carrier is associated with at least one of: a downlink (DL) carrier receiving the ULCI or a cancellation indication field indicating the cancelled resources in the ULCI.

15. The method of claim 14, wherein the UL carrier comprises a configured UL carrier used to transmit the CLI measurement report, and wherein the UL carrier is indicated in a trigger state.

16. A method for wireless communications by a network entity, comprising:
transmitting, to a user equipment (UE), an uplink (UL) cancellation indication (ULCI) cancelling resources assigned to the UE for UL transmission and indicating whether the UE is to measure cross-link interference (CLI) from one or more other UEs within the cancelled resources; and
receiving, from the UE, an indication of the CLI measured by the UE based on the ULCI.

17. The method of claim 16, wherein the ULCI comprises a flag indicating measurement of the CLI from the one or more other UEs within the cancelled resources is triggered by the ULCI.

18. The method of claim 17, wherein the flag comprises a bit indicating the UE is to measure CLI for all cancellation indications in the ULCI.

19. The method of claim 17, wherein the flag comprises a bit for each cancellation indication in the ULCI, each bit indicating whether the UE is to measure CLI for a corresponding cancellation indication.

20. The method of claim 16, wherein:
the cancelled resources are assigned to the one or more other UEs;
the network entity receives separate reports of the CLI measured for the one or more other UEs from the UE; and
the ULCI indicates a resource granularity for measuring the CLI from the one or more other UEs within the cancelled resources.

21. The method of claim 20, wherein a size of a CLI measurement report indicating the CLI measured by the UE depends on the resource granularity.

22. The method of claim 16, further comprising:
sending signaling indicating a CLI threshold, wherein a CLI measurement report indicates whether the measured CLI is above the threshold.

23. The method of claim 16, wherein a trigger state is associated with the ULCI to measure the CLI from the one or more other UEs within the cancelled resources and generate the CLI measurement report based on the measured CLI.

24. The method of claim 16, wherein the network entity receives the CLI measurement report transmitted by the UE on a UL carrier, and wherein the UL carrier is associated with at least one of: a downlink (DL) carrier receiving the ULCI or a cancellation indication field indicating the cancelled resources in the ULCI.

25. The method of claim 24, wherein the UL carrier comprises a configured UL carrier used to transmit the CLI measurement report, and wherein the UL carrier is indicated in a trigger state.

26. An apparatus for wireless communications by a user equipment (UE), comprising:
at least one application processor and a memory configured to:
receive, from a network entity, an uplink (UL) cancellation indication (ULCI) cancelling resources assigned to the UE for UL transmission and indicating the UE is to measure cross-link interference (CLI) from one or more other UEs within the cancelled resources;
measure the CLI from the one or more other UEs based on the ULCI; and
send, to the network entity, a CLI measurement report based on the measured CLI.

27. The apparatus of claim 26, wherein the ULCI comprises a flag indicating measurement of the CLI from the one or more other UEs within the cancelled resources is triggered by the ULCI.

28. The apparatus of claim 27, wherein the flag comprises a bit indicating the UE is to measure CLI for all cancellation indications in the ULCI.

29. An apparatus for wireless communications by a network entity, comprising:
at least one application processor and a memory configured to:
transmit, to a user equipment (UE), an uplink (UL) cancellation indication (ULCI) cancelling resources assigned to the UE for UL transmission and indicating whether the UE is to measure cross-link interference (CLI) from one or more other UEs within the cancelled resources; and
receive, from the UE, an indication of the CLI measured by the UE based on the ULCI.

30. The apparatus of claim 29, wherein the ULCI comprises a flag indicating measurement of the CLI from the one or more other UEs within the cancelled resources is triggered by the ULCI, and wherein the flag comprises a bit indicating the UE is to measure CLI for all cancellation indications in the ULCI.

* * * * *